United States Patent [19]
Cameron

[11] 3,791,750
[45] Feb. 12, 1974

[54] DOWEL
[76] Inventor: Herbert A. Cameron, 24 Brooks Ave., Lewiston, Maine 04240
[22] Filed: May 15, 1972
[21] Appl. No.: 253,526

[52] U.S. Cl.................. 403/297, 85/19, 52/753 E
[51] Int. Cl............................................. E04b 1/48
[58] Field of Search ............. 85/19, 20, 21, DIG. 2; 287/127 R, 20.92 E

[56] References Cited
UNITED STATES PATENTS
| | | | |
|---|---|---|---|
| 3,674,068 | 7/1972 | Lucci | 287/127 R |
| 2,927,497 | 3/1960 | Rapata | 85/21 |
| 2,510,693 | 6/1950 | Green | 85/DIG. 2 |
| 2,380,287 | 7/1945 | Baumbach | 85/19 |
| 3,425,721 | 2/1969 | Agee | 287/127 R |

Primary Examiner—Jordan Franklin
Assistant Examiner—Conrad L. Berman
Attorney, Agent, or Firm—Melvin R. Jenney et al.

[57] ABSTRACT

A dowel pin is formed by extruding hot plastic through a cooled die plate to form a cylindrical structure having on its surface a multiplicity of thin resilient fins most of which are disposed transversely to the longitudinal axis of the cylinder. The fins not only provide a roughened surface for better adhesion when combined in a joint with a suitable glue, but also exhibit plastic memory causing them to thrust against the wall of the bore in which the dowel is inserted, in order to effect a permanent joint. In one form the dowel is shaped with an hour-glass cross-section so that it may be inserted into a pair of overlapping bores and thereby provide greatly improved resistance to rotational forces.

1 Claim, 3 Drawing Figures

PATENTED FEB 12 1974 3,791,750

3,791,750

DOWEL

BACKGROUND OF THE INVENTION

In the furniture industry wooden dowel pins have generally been employed to form joints, and although various designs have been employed with the objective of improving the life of dowelled joints, the fact that wood is hygroscopic has hitherto been a well-nigh insuperable barrier to the fabrication of permanent joints. As the wood swells and contracts in response to variations in humidity, the locking function of a dowel progressively deteriorates until the joint ultimately fails.

SUMMARY OF THE INVENTION

I have discovered that the efficiency and economy of dowelled joints can greatly be improved by extruding hot thermoplastic material through a cold die plate to form a rod having on its surface a multiplicity of thin fins or ridges extending substantially transversely to the longitudinal axis of the rod. Dowels of appropriate length are then cut from the extruded rod.

When the hot thermoplastic material meets the cold die plate, the part of the plastic coming into contact with the cold wall of the die plate immediately tends to solidify whereas the interior is still relatively fluid. The solidifying outer sheath tends to adhere to the surface of the aperture in the die plate, thereby causing, by a pulling action, the formation of the transverse fins or ridges.

In practice the dowel is first coated with a suitable glue and then inserted in a hole bored in a wooden member, the diameter of the bore being equal to the diameter of the dowel proper. That is to say, the diameter of the bore is the same as the diameter of the dowel measured at the base of the fins. The result is that the fins are flattened as the dowel is inserted into the bore. Inasmuch as the flattened fins exhibit plastic memory, they try to resume their normal upright position and thus exert thrust radially against the wall of the bore, thrust which greatly increases the friction tending to lock the dowel permanently in position. Since the plastic material is not hygroscopic, and is also resilient, the joint will remain tight regardless of variations in the moisture content of the wood surrounding the dowel. That is to say, the dowel comes and goes as the surrounding wood swells and contracts as its moisture content varies.

In one embodiment the dowel is extruded through a die plate having an aperture formed, in cross-section, as an hourglass, or a pair of intersecting circles. Such a dowel can be inserted into a bore of similar cross-section formed by drilling two overlapping holes. A joint fashioned with such a dowel is particularly useful where the joint is to be subjected to rotational forces.

BRIEF DESCRIPTION OF THE DRAWINGS

The several features and advantages of dowels constructed in accordance with the invention will be more readily understood and appreciated from the following detailed description of preferred embodiments thereof selected for purposes of illustration as shown in the accompanying drawings in which.

DESCRIPTION OF PREFERRED EMBODIMENTS

Figure 2:
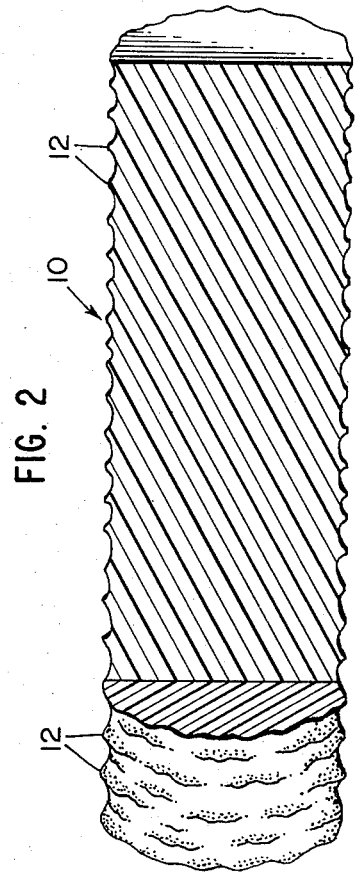
FIG. 2 is a view partly in side elevation and partly in cross-section of a dowel constructed in accordance with the invention.

As shown in FIG. 2 a dowel comprises a cylinder 10 of thermoplastic material having on its surface a multiplicity of relatively thin ridges or fins 12. Although there are obviously many specific formulations which could be employed to make dowels in accordance with my invention, I have found that good results can be achieved by using a mixture comprising, by weight, about 35 percent rigid polyvinyl chloride, 15 percent plasticizer and 50 percent filler. The filler may be clay, diatomaceous earth, or other conventional materials. Any suitable plasticizer may be employed; I have secured excellent results with di-octyl-phthalate.

It is important that the plastic material be somewhat resilient but generally firm. For obvious reasons it should not be hard or brittle. More importantly, the material must be of such character that the fins or ridges 12 are resilient.

Figure 1:
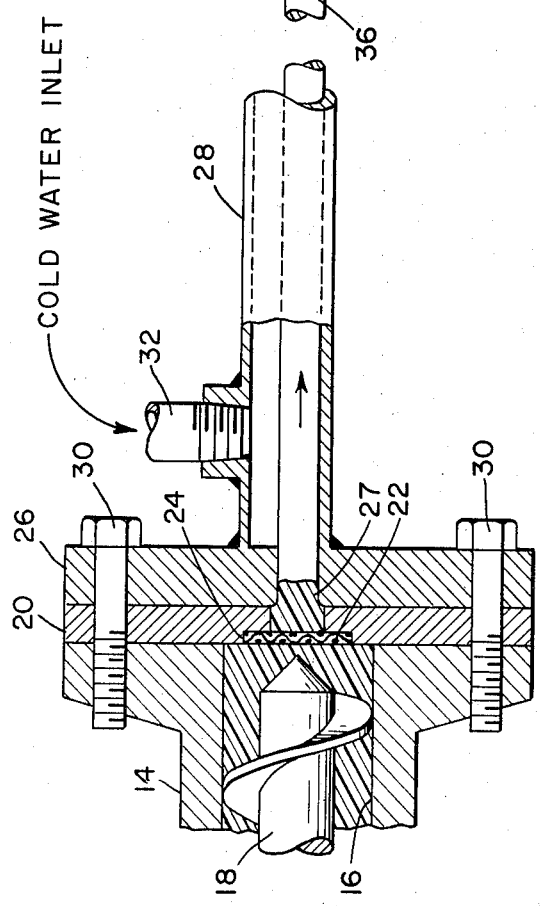
FIG. 1 is a view in side elevation and partly in section of apparatus arranged for the extrusion of dowels manufactured in accordance with the invention.

The apparatus shown in FIG. 1 includes a conventional extruder (only a part of which is shown) and comprises a barrel 14 having a longitudinal bore 16 housing a conveyor screw 18. At the discharge end of the barrel there is a plate 20 bearing a screen 22 extending across a central aperture 24. Also I provide a die plate 26 having a central aperture 27, the die plate 26 and screen plate 20 being secured to the end of the barrel 14 by means of a plurality of bolts 30. Welded to the outer face of the die plate 26 is an elongated metal tube 28 provided adjacent the die plate with an inlet pipe 32 through which cold water is introduced into the tube 28. The outer end 34 of the tube 28 is open so that the water drains out. The arrangement is such that hot thermoplastic material is carried along the bore 16 by the screw 18 and forced through the screen 22 and through the central aperture 27 in the die plate 26 and thence through the tube 28. The thermoplastic material is thereby formed into a rod 36 passing through the tube 28.

The cooling water entering the tube 28 acts to cool the die plate 26. As the thermoplastic material passes through the die plate the outer surface portion is rapidly chilled and consequently tends to solidify and stick to the wall of the aperture 27. As a result the relatively thin fins or ridges 12 are, in effect, plucked from the surface of the rod 36. Dowels of desired length are cut from the rod 36.

When a joint is to be formed with a dowel of my invention, each of the pieces to be joined is drilled to provide a bore having a diameter equal to the diameter of the body of the dowel measured at the bases of the fins. Then a dowel is coated with a suitable glue and driven into one of the bores. Subsequently the piece with the other bore is forced into position over the dowel and the pieces are clamped together in conventional fashion until the glue has had an opportunity to set. As the dowel is inserted into the bore, the fins 12 are flattened somewhat. While the rough surface of the dowel cooperates with the glue to form a locked joint, the permanency of the joint is greatly increased by reason of the plastic memory of the flattened fins. They try to return to their original upstanding position and thereby exert radial thrust outwardly against the wall of the bore. If variation in the moisture content of the wood causes the bore slightly to enlarge, the resilient fins flex slightly outwardly and maintain the thrusting locking force against the wall of the bore. Of course the plastic material of the dowel is not hygroscopic and the dowel does not swell or shrink with changes in ambient humidity.

Figure 3:
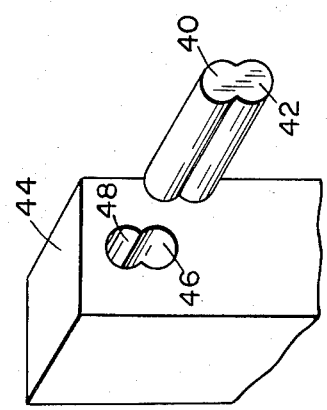
FIG. 3 is a view in perspective of an alternative form of a dowel.

In FIG. 3 I have shown an alternative form of dowel particularly useful in fabricating joints which are to be subjected to severe rotational forces. The dowel shown in FIG. 3 is extruded through a die plate in which the aperture has the shape and cross-section of an hourglass, or two overlapping or intersecting circles. In effect there is formed a pair of dowels 40 and 42 linked together in siamese twin formation. The method of making the dowel shown in FIG. 3 is the same as for the single dowel previously described.

There is also shown in FIG. 3 a piece of wood 44 into which there have been drilled a pair of overlapping or intersecting bores 46 and 48, matching the cross-sectional shape of the twin dowel. The twin dowel is driven into the bores, just as before, and the result is the same, except for the fact that the cross-sectional shape offers vastly greater resistance to any forces tending to rotate the member 44 about the dowel.

While the rod is generally of cylindrical or hourglass form, other cross-sections are entirely feasible and come within the scope of the invention.

Having now described and illustrated preferred embodiments of my invention, what I claim as new and desire to secure by Letters Patent of the United States is:

1. A dowel comprising a cylindrical rod of constant diameter formed of firm resilient plastic material, said material comprising polyvinyl chloride, a plasticizer and a filler, and a multiplicity of thin, randomly disbursed, resilient upright fins extending radially outwardly from said rod at a uniform heighth, said rod and fins being formed from a single piece of said plastic material, said fins extending from and over the entire periphery and length of the rod and presenting a roughened surface over the entire peripheral surface of the rod, the majority of said fins being disposed transversely to the long axis of the rod, said resilient fins having plastic memory, so that when they are flattened when the rod is driven into a bore they tend to resume their normal upright position and exert thrust radially against the wall of the bore.

* * * * *